Nov. 21, 1967    R. F. MOYER    3,353,876
PRE-LOADED AXIALLY EXTENSIBLE ANTI-FRICTION BEARING
Filed Nov. 6, 1964    4 Sheets-Sheet 1
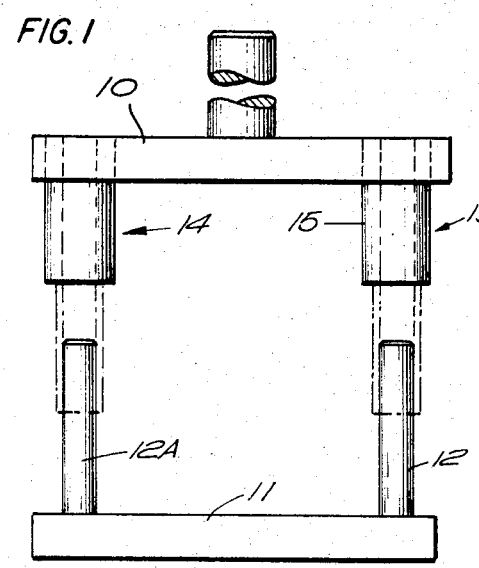
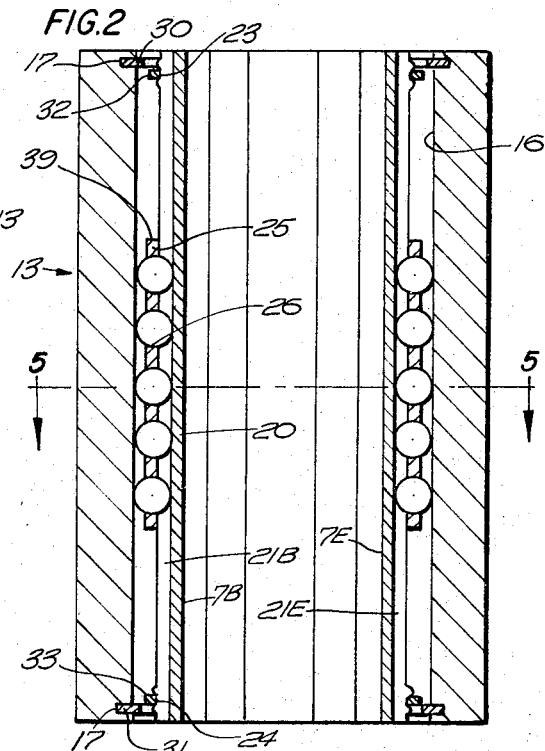
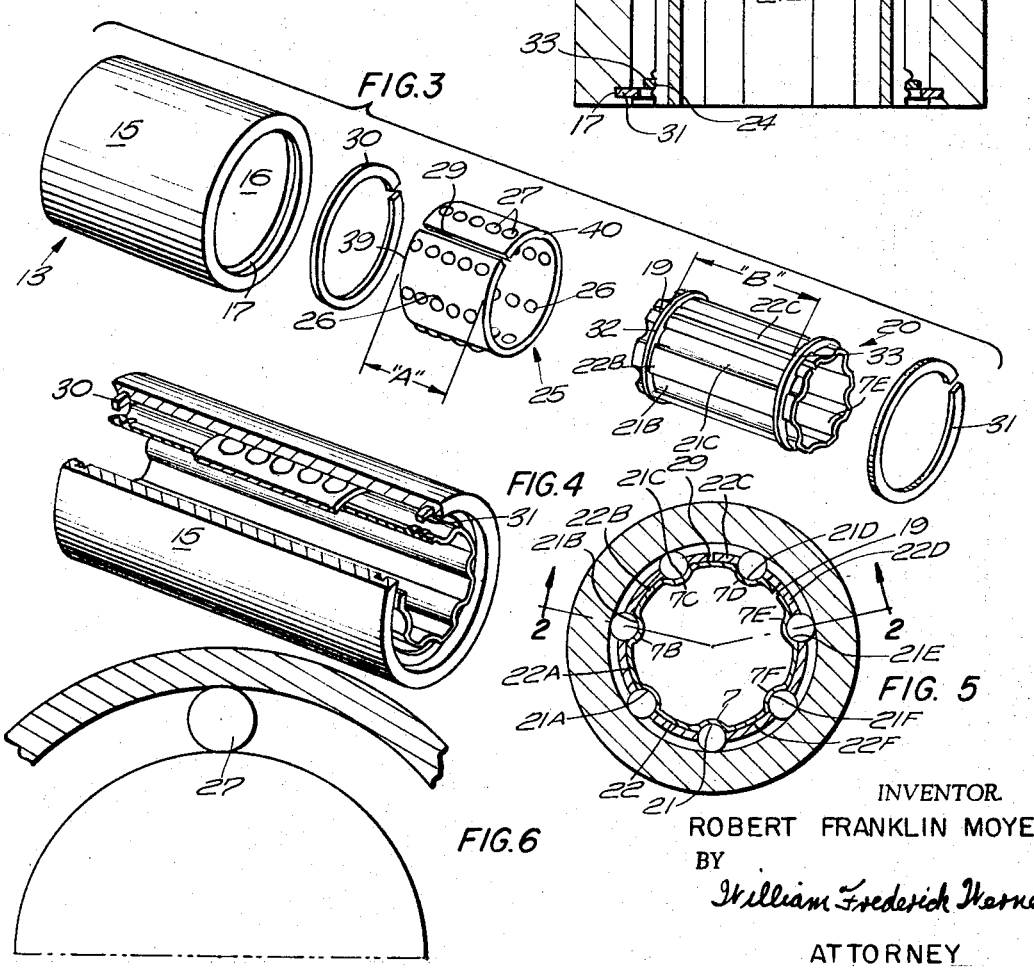
INVENTOR.
ROBERT FRANKLIN MOYER
BY
William Frederick Werner
ATTORNEY Nov. 21, 1967  R. F. MOYER  3,353,876
PRE-LOADED AXIALLY EXTENSIBLE ANTI-FRICTION BEARING
Filed Nov. 6, 1964  4 Sheets-Sheet 2
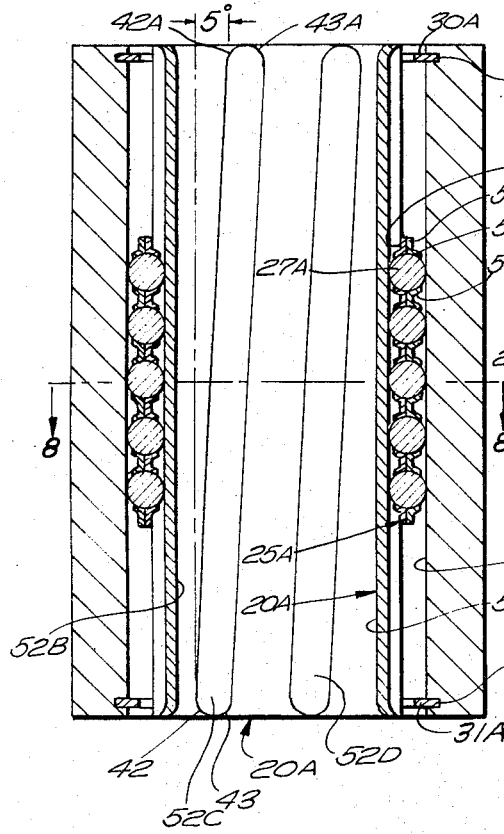
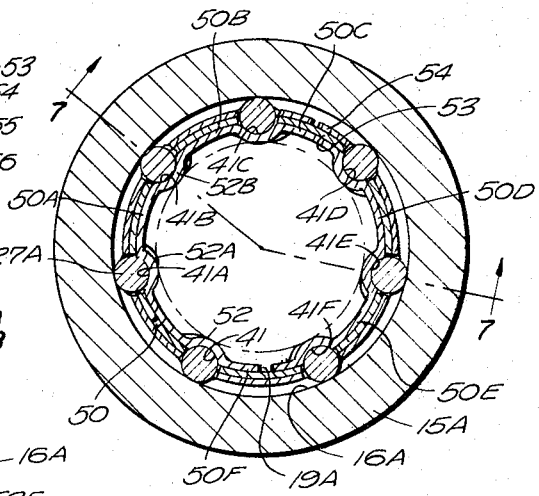
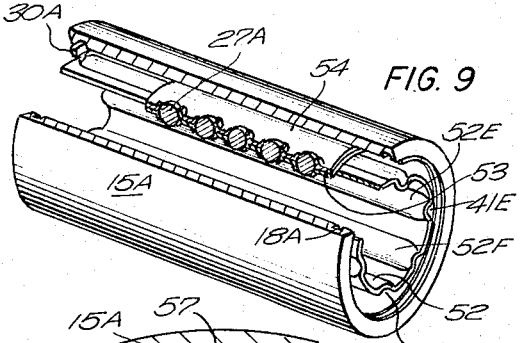
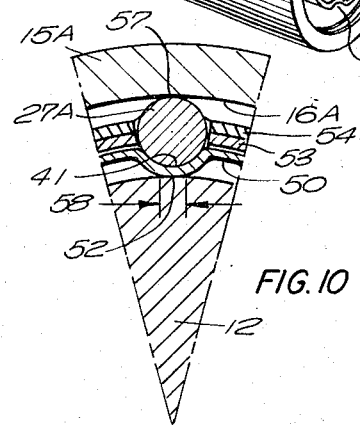
INVENTOR.
ROBERT FRANKLIN MOYER
BY
William Frederick Werner
ATTORNEY

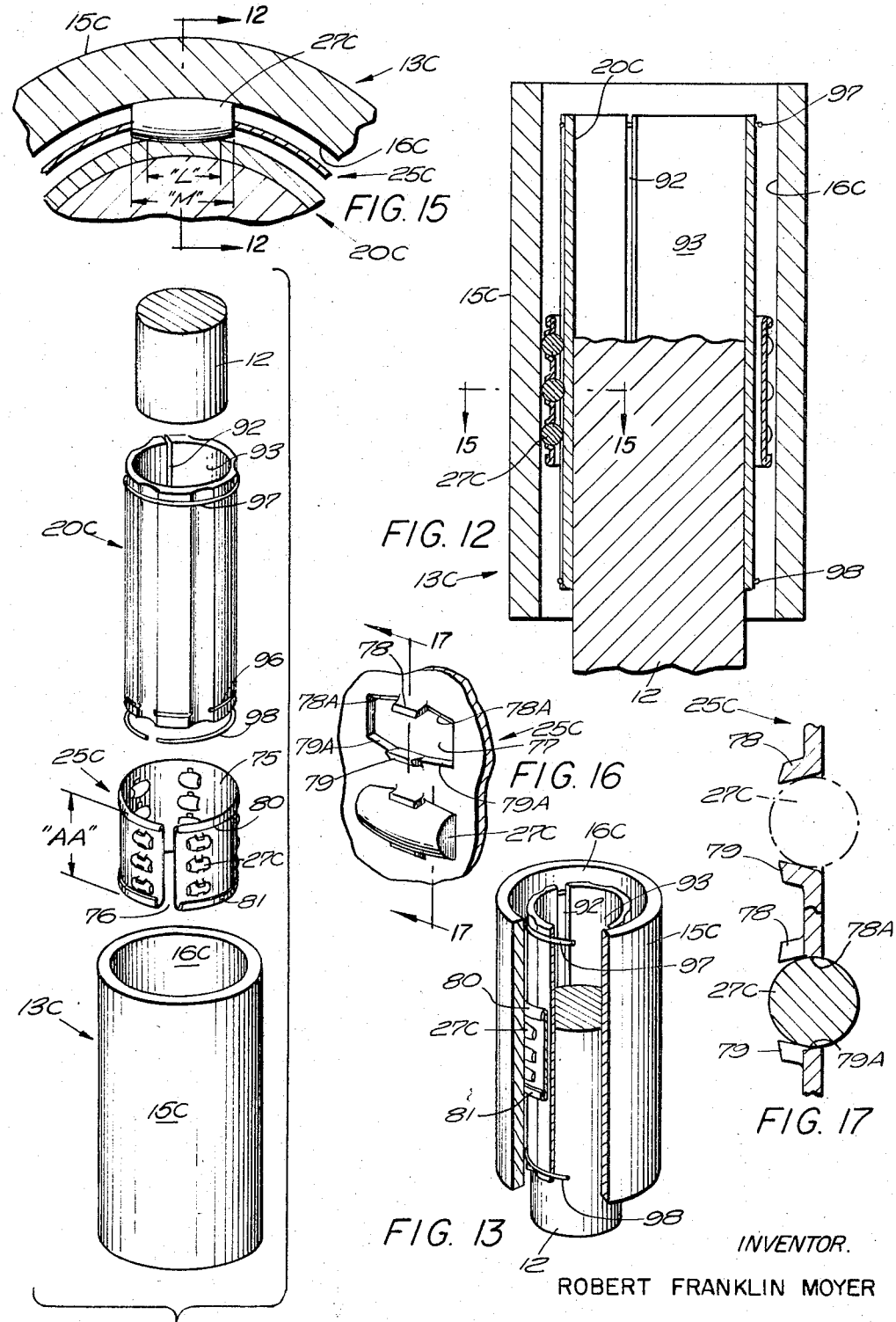

Nov. 21, 1967 R. F. MOYER 3,353,876
PRE-LOADED AXIALLY EXTENSIBLE ANTI-FRICTION BEARING
Filed Nov. 6, 1964 4 Sheets-Sheet 4
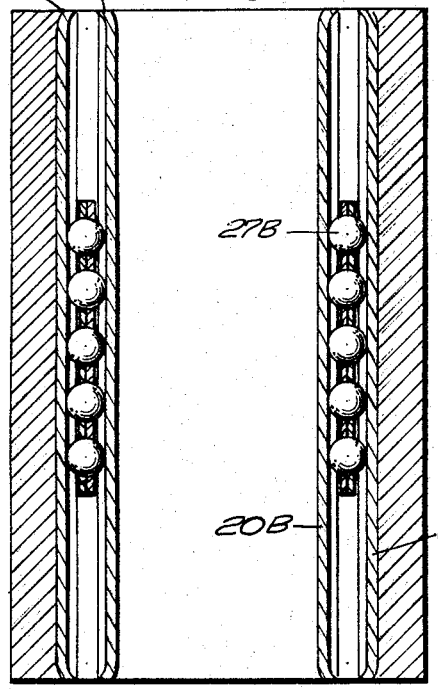
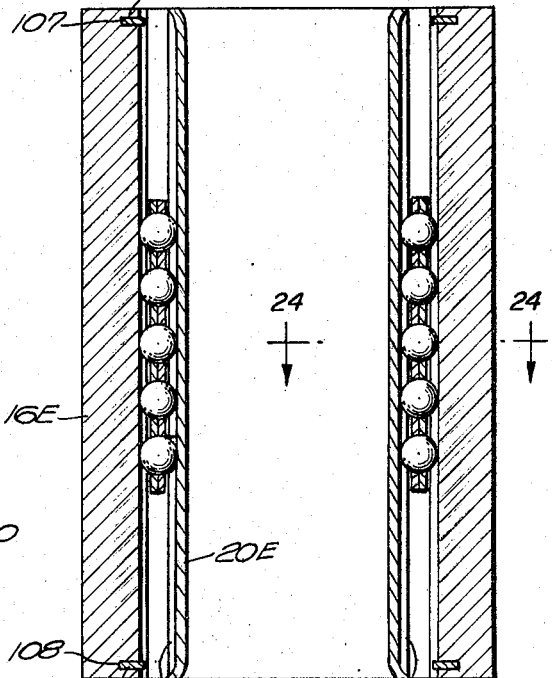
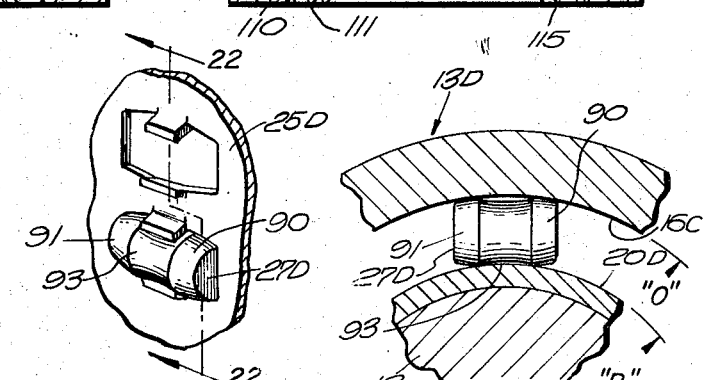
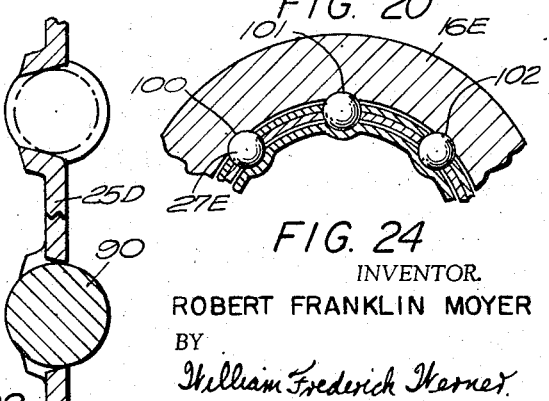
INVENTOR.
ROBERT FRANKLIN MOYER
BY
William Frederick Werner
ATTORNEY United States Patent Office 3,353,876
Patented Nov. 21, 1967

3,353,876
PRE-LOADED AXIALLY EXTENSIBLE
ANTI-FRICTION BEARING
Robert Franklin Moyer, Warwick, R.I., assignor to Elastic Die Engineering Company, Warwick, R.I., a corporation of Rhode Island
Filed Nov. 6, 1964, Ser. No. 409,383
10 Claims. (Cl. 308—6)

This invention relates to pre-loaded, axially extensible anti-friction bearings and more particularly to improvements in the bearings employed in a die set.

Certain classes of articles are fabricated by the use of die sets fastened to punch presses. The bottom plate of the die set, to which the female die is secured, is fastened to the base of the punch press. The upper plate of the die set, to which the male punch is secured, is fastened to the reciprocable plunger of the punch press. Reciprocal movement of the plunger causes the male punch to mate with the female die. Sheet metal stock is placed between the punch and die, which when they come together, either stamp out or form the stock to the desired shape.

It is imperative to have the punch and die in proper alignment with each other. It is therefore customary to provide the bottom plate of the die set with a plurality of posts and the upper plate with a plurality of mating bushings; thus maintaining alignment between the punch and die.

It will be noted that the punch and die alignment is almost wholly determined by the fit between the posts and mating bushings. Heretofore one difficulty has been to keep the tolerances of the fits between the posts and bearings at a minimum. If the fit was too loose they could become laterally misaligned and destroy the sharp edges of the punch and/or die. If the fit was too close, the friction developed during use caused heating and freezing of the mating parts making the punch press inoperative. Still another disadvantage realized due to loose fitting or worn posts was noticed in the parts that were being formed. Instead of the parts having sharp clean edges, flat metal or fins appeared around the edges which made necessary subsequent operations of flattening or trimming for the removal thereof. Still further, these disadvantages were greatly aggravated when the punching operations were carried out at a high speed.

It is therefore an object of the present invention to provide an improved die set for punch presses through an improved anti-friction bearing.

It is another object of the present invention to provide a die set where there will be no binding or freezing of the mating parts in spite of the maintenance of close tolerances.

Another object of the present invention is to provide a die set which will prolong the life of the dies.

Another object of the present invention is to provide a die set which may be operated at high speed and still maintain truer alignment than was heretofore possible in prior art die sets.

Another object of the present invention is to provide a die set which can be operated at high speed and travel laterally with the stock and still maintain alignment and avoid the extreme wear entailed in this type of operation.

Still another object of the present invention is to provide a die set with a lateral stroke greater than the length of the posts, while retaining bearing engagement with the posts.

And still another object of the present invention is to reduce the friction between posts and bearings in a die set.

A further object of the present invention is to provide a "line" contact between the moving parts associated with an anti-friction bearing rather than a "point" contact which is the prevailing practice.

And still a further object of the present invention is to provide a structure whereby the individual ball members of an anti-friction bearing carry a greater work load to thereby reduce the number of balls needed for a given work load.

Other objects of the present invention will be pointed out in part and become apparent in part in the following specification and claims.

Referring to the drawings in which similar characters of reference indicate corresponding parts in all the figures:

FIGURE 1 is a side elevational view of the new and improved die set.

FIGURE 2 is a vertical cross sectional view through a bushing; taken on line 2—2 of FIGURE 5, with the upper plate removed.

FIGURE 3 is an exploded perspective view of the bushing shown in FIGURE 2.

FIGURE 4 is a perspective view of the bushing, with a portion broken away to illustrate the relationship of the several parts in assembled condition.

FIGURE 5 is a horizontal cross sectional view through the bushing and is taken along line 5—5 of FIGURE 2.

FIGURE 6 is a schematic view partly in cross section illustrating the ball member of an anti-friction bearing making a two point contact with associated members.

FIGURE 7 illustrates a modified form of inner race having grooves set at an angle to the vertical axis of the bushing and provided with a "line" of contact for the ball members on one side thereof and a "point" contact on the other side thereof.

FIGURE 8 is a horizontal cross sectional view taken along line 8—8 of FIGURE 7.

FIGURE 9 is a perspective view of the modified form of bushing, shown in FIGURE 7, with a portion broken away to illustrate the relationship of the several parts in assembled condition.

FIGURE 10 is a schematic cross sectional view illustrating a "line" contact and a "point" contact of a ball member.

FIGURE 11 is a horizontal cross sectional view similar to FIGURE 8 showing still another modified form of ball bearing construction wherein the ball member is provided with two "line" contacts.

FIGURE 12 is a vertical cross sectional view through a bushing illustrating a modified form of anti-friction bearing construction, namely, a barrel roller.

FIGURE 13 is a perspective view of the modified form of bushing, shown in FIGURE 12, with a portion broken away to illustrate the relationship of the several parts in assembled condition.

FIGURE 14 is an exploded perspective view of the bushing shown in FIGURE 13.

FIGURE 15 is a fragmentary cross sectional view, taken on line 15—15 of FIGURE 12.

FIGURE 16 is a fragmentary perspective view illustrating the barrel type anti-friction bearing.

FIGURE 17 is a fragmentary cross sectional view taken on line 17—17 of FIGURE 16, further illustrating the construction of a barrel type anti-friction bearing.

FIGURE 18 is a vertical cross sectional view taken on line 18—18 of FIGURE 11.

FIGURE 19 is a view similar to FIGURE 18 showing a modified form of race wherein the race wall is grooved in place of a grooved outer race sleeve.

FIGURE 20 is a fragmentary cross sectional view, similar to FIGURE 15 showing a multiple radius roller type anti-friction bearing in place of a barrel type anti-friction bearing.

FIGURE 21 is a view similar to FIGURE 16 showing a multiple radius roller type of anti-friction bearing in place of a barrel type anti-friction bearing.

FIGURE 22 is a view similar to FIGURE 17 and is taken on line 22—22 of FIGURE 21.

FIGURE 23 is a view similar to FIGURE 14 illustrating the multiple radius roller type of anti-friction bearing employed in a laterally extensible anti-friction bearing.

FIGURE 24 is a fragmentary horizontal cross sectional view taken on line 24—24 of FIGURE 19.

Although the invention about to be described is described as used in connection with punch presses housing die sets; it is not my intention that the invention be so limited, since it will be clear that it can be used on any type of machine requiring a pre-loaded, laterally or axially extensible, anti-friction bearing.

Referring to FIGURE 1 of the drawings, wherein is illustrated a die set comprising an upper plate 10 and a bottom plate 11, which may be adapted, respectively, for attachment to the traveling ram and the bed of a punch press.

The bottom plate 11 is provided with a plurality of posts 12, 12A, cylindrical in form and fastened therein. The length of posts 12, 12A is preselected to coincide with the desired stroke of the press ram. FIGURE 1 illustrates two posts 12, 12A. It is within the purview of the present invention to provide three or more posts, if necessary or desirable.

Upper plate 10 is provided with a plurality of bushings, generally indicated by reference numerals 13, 14 and equal in number to the number of posts 12, 12A, secured in bottom plate 11.

The construction of one bushing, 13, will be given. It is to be noted that all bushings are of the same construction.

Bushing 13 consists of a housing cylindrical in form and provided with an outside surface 15 and an axial bore or inside surface 16. Two circular recesses 17, 18 are provided in the inside surface 16.

Inside surface 16 is a smoothed bore cylinder, hardened and ground to provide a bearing surface for purposes which will presently appear. It serves the function of a race wall or outer race for ball bearings in the form of construction shown in FIGURES 2, 3, 4 and 5.

The nub of the present invention is the inner race, generally indicated by reference character 20, and consists of a stamping, fabricated from resilient material or spring steel. Inner race 20 is provided with a plurality of grooves 21, 21A, 21B, 21C, 21D, 21E and 21F, and a plurality of interconnecting shoulders 22, 22A, 22B, 22C, 22D, 22E and 22F. A plurality of crowns 7, 7A, 7B, 7C, 7D, 7E and 7F, are formed as the back surface of the plurality of the respective grooves 21, 21A, 21B, 21C, 21D, 21E and 21F. An upper annular recess 23 and a lower annular recess 24 are provided in interconnecting shoulders 22, 22A, 22B, 22C, 22D, 22E and 22F. Inner race 20 is provided with a slit 19 so that it may be squeezed when placed in operative position. Snap rings 32, 33 are positioned, respectively, in upper and lower annular recesses 23, 24.

A retainer, generally indicated by reference numeral 25, is provided with a plurality of ball receiving orifices 26 which hold balls 27 in their proper position in relation one to the other and which also prevents balls 27 from dropping out of position when assembled with inner race 20. The walls of orifices 26 which receive the balls 27 extend inward slightly to restrict the size of the orifices 26 on the side toward the bushing as can be seen in FIGURE 2. The balls 27 are thus located within retainer 25 which cooperates with grooves 21, 21A, 21B, 21C, 21D, 21E and 21F to hold balls 27 in place when inner race 20 is slid into retainer 25. In this way the balls 27 are located in grooves 21, 21A, etc., and in retainer 25.

Retainer 25 is split as shown by longitudinal cut 29. Retainer 25 dimension A is generally limited in length to one-half the distance between upper and lower annular recesses 23, 24, respectively, dimension B. Retaining rings 30, 31 are located respectively, in circular recesses 17, 18.

The several parts are assembled as follows:

Balls 27 are placed in orifices 26. Retainer 25 is then slid over inner race 20 with balls 27 located respectively, in grooves 21, 21A, 21B, etc. Snap rings 32, 33 are placed in annular recesses 23, 24, respectively. Retainer 25 and inner race 20 are then slid into bushing 13 with balls 27 engaging inside surface or race wall 16. Retainer rings 30, 31 are then placed in circular recesses 17, 18, respectively.

The outside surface of post 12 is then inserted into inner race 20 with crowns 7, 7A, 7B, etc., engaging the outside surface of post 12. Balls 27 are of a preselected size so that upon the insertion of post 12 into contact with crowns 7, 7A, 7B, etc., the balls become loaded. That is, the balls 27 are of a diameter which is at least equal to the distance, dimension C (FIG. 2) from the base of a groove 21 to inside surface 16. It is also desirable to utilize balls which are slightly larger than this space, dimension C. In this event the balls would fit tightly between the groove and inside surface 16 so that there would be no lateral movement of the post and inner race 20. Balls which are slightly larger in diameter than dimension C will result in light loading, whereas balls of larger diameter will result in heavier loading. In this manner the loading may be light, medium or heavy, depending upon the intended use. Slits 19 and 29 provide the resiliency needed for the preloading, i.e., before post 12 is inserted.

As shown in FIGURES 2, 3, 4 and 5, the balls extend in rows around the inner race 20 and therefore around post 12. The rows of balls 27 are in vertically spaced relation to each other. In FIGURES 2, 3, 4 and 5, seven rows of five balls each are illustrated in that embodiment. The number of rows of balls is preferably always an odd number so that three balls may form a three line contact on the post in the form of an approximate equilateral triangle capable of withstanding side thrust created in a die set in the following manner.

As previously stated upper plate 10 will have a male punch secured thereto and depending therefrom. Lower plate 11 will have a cooperating female die secured thereto. Sheet material will lie upon the female die. As upper plate 10 strikes the sheet material it encounters resistance which is transferred as side thrust to the bushings 13, 14 attached to upper plate 10 and slidably mounted upon posts 12, 12A, respectively. Since it is the posts 12, 12A, which seek to hold upper plate 10 in parallel relation to lower plate 11, it follows that the vertically moving bushings become subject to the side thrust as they slidably engage the respective mating post. This side thrust must be absorbed if the necessary absolute parallelism between upper plate 10 and lower plate 11 is to be maintained for the successful entering of the punch and material into the female die. Misalignment between punch and die even to a modest extent produces inaccurate punchings. Misalignment to a greater extent breaks and ruins the expensive punch and die.

Another condition to be considered is the wear between the post 12 and the mating bushing 13. The present invention compensates for that wear as it takes place, thereby creating a longer life in the die set.

Still another condition to be considered is the fact that the reciprocating ram of a punch press will vary its stroke as it reciprocates rapidly in daily use and the necessary length of stroke of the punch press is not always properly provided due to human error in the mechanic making the adjustment. The present invention obviates the disastrous effects of broken punches and ruined dies due to the conditions cited.

The structure illustrated in FIGURES 2, 3 4 and 5 provides a new concept, structure, function and result in the use of anti-friction bearings in a die set. Instead of a ball bearing making a point of contact (see FIG. 6) on the inner and outer race of relative moving parts, and thereby requiring a given number of ball members, the number being determined by the load each ball member carries; applicant provides an inner race 20 with the new structural concept of being resilient slidably mounted with an odd number of ball seats having a "line" contact mathematically determined.

Applicant has conceived the fact that a condition where forty percent of the diameter of a ball engages a cooperating surface, the ball will carry a load eight times as great as the load carried by the same ball making a mere point contact with the cooperating surface. Translated into use, that means that one ball having a line contact with a cooperating surface will carrying eight times the load of a point of contact ball, thereby reducing the number of balls needed for a given load.

Applicant provides grooves 21, 21A, 21B, etc., with a mating shape for balls 27 whereby balls 27 engage grooves 21, 21A, etc., with forty percent of their surface (see FIG. 5). In this manner a relatively short length retainer 25 may be provided, so that, in the illustrated example for use in a die set, retainer 25 may have a length, dimension A, one half or less than the length of inner race 20, dimension B.

The length of retainer 25, dimension A is determined by the load the roller elements 27 must carry and the circumferential dimension of the roller elements 27.

With the advent of dimension A being less than dimension B, inner race 20 may move relatively to retainer 25 and thereby provide an extensible or telescopic anti-friction bearing for a die post 12.

In assembled condition ready for operational use, roller elements 27 will be rotatively mounted between outer race 16 and grooves 21, 21A, 21B, etc. The crowns 7, 7A, 7B, etc., will resiliently grasp post 12.

It has been found that normal reciprocation of upper plate 10 toward lower plate 11 within the normal working length of stroke of bushing 13 upon post 12 leaves retainer 25 with edge 40 abutting snap ring 33. That is the relative position of retainer 25 with outer race 16 at the bottom of the normal stroke.

The frictional gripping of the ball elements 27 between outer race 16 and grooves 21, 21B etc., will cause the ball elements 27 to rotate as outer race 16 moves in an upward direction as viewed in FIGURES 1 and 2. The ball elements 27 will also move in an upward direction. However, the distance the balls travel will be determined by the circumference of the individual ball elements 27 rotating in union. The linear distance the balls travel will be less than the linear distance travelled by inner surface 16. So long as the length of stroke of bushing 13 remains less than dimension B, roller elements 27 perform the function of an anti-friction bearing located between an outer race 16 and an inner race as represented by grooves 21, 21A, 21B, etc., and the linear distance travelled by bushing 13 will be twice the length (dimension A) of retainer 25 when said retainer is one half the length of the distance between retaining rings 30, 31.

A known principle is that if a ball is rolled between a moving and a stationary plate, the translational velocity of the ball center is one-half that of the moving plate. Thus the plate moves twice as far as the ball center.

Translated to the present disclosure relates outer race 16 as the moving plate and grooves 21, 21A, etc., as the stationary plate with retainer 25 and roller elements 27 as the rolled balls. Thus outer race 16 or bushing 13 moves twice as fast and twice as far as retainer 25.

When the retainer 25 thru edge 40 is in position to abut snap ring 33 and with retaining ring 31 located immediately below snap ring 33, then bushing 13 may move downwardly a distance of four inches or a distance equal to the length of the bushing 13. This is so because as bushing 13 moves downwardly it rotates ball members 27 in a direction which causes said ball members 27 to move retainer 25 upwardly until edge 39 engages snap ring 32 as ball members 27 engage grooves 21, 21A, etc. It is assumed that the length of retainer 25 is one half the length of bushing 13 or two inches long, dimension A. The example given contemplates a four inch long bushing 13 and a two inch long retainer 25 which gives a four inch stroke on the bushing or a stroke ratio of 2:1 over the length of the retainer 25. As the bushing stroke exceeded four inches in prior constructions the balls would lock meaning that the bushing 13 would be compelled to stop because the bushing had reached the limit of its movement with edge 39 engaging both snap ring 32 and retaining ring 30. The bushing would therefore be compelled to reverse the direction of its downward movement.

With the advent of the present construction, the bushing 13 may continue its downward movement because the ball members 27 when locked in this position are locked to a movable member, namely, inner sleeve 20 which is frictionally attached to post 12, through crowns 7, 7A etc. In this manner continued downward movement of bushing 13 will cause retaining ring 30 engaging edge 32 and the locked ball members 27 to frictionally drag inner race 20 downwardly on post 12 so that bushing 13 is provided with an additional movement of the length of the inner race 20 dimension B on the post 12.

Bushing 13 will have the additional movement of the difference in length between the length of outer race 16 and the length of inner race 20 before the inner race 20 will be telescoped to its maximum length. Thereafter it will drag along the post.

FIGURES 7, 8 and 9 illustrate a modified form of inner race 21A, adapted to accommodate an excessive amount of side thrust and to eliminate two snap rings 32, 33.

Bushing 15A is identical in construction with bushing 15 and consists of inner surface 16A, circular recesses 17A, 18A with retaining rings 30A, 31A located respectively, in circular recesses 17A, 18A.

Inner race 20A is modified to the extent of having the plurality of grooves 41, 41A, 41B, 41C, 41D, 41E and 41F located at an angle of five degrees (5°) from the vertical is viewed in FIGURE 7, with the opposite ends of said grooves rolled over as at 42, 43, 42A, 43A. In this manner balls 27A cannot roll out of the ends of grooves 41, 41A, etc., and snap rings 32, 33 are dispensed with.

Inner race 20A is provided with interconnecting shoulders 50, 50A, 50B, 50C, 50D, 50E, 50F between, respectively, grooves 41, 41A, etc., see FIGURE 8. Shoulder 50F is slit 19A to provide resiliency to the spring steel from which inner race 20A is fabricated. The back surfaces of grooves 41, 41A will be termed crowns and are indicated at 52, 52A, etc.

Separator 25A is fabricated from two mating cages 53, 54 which are adapted to rotatively mount balls 27A in a manner well known to the ball bearing art. Suffice it to say cages 53, 54 provide mating halves of upper and lower concave surfaces 55, 56 and the balls 27A are retained between the opposite and adjacent concave surfaces 55, 56. Cages 53, 54 are fastened together, as by spot welding.

In the form of inner race 20A shown in FIGURES 7, 8 and 9 the side thrust, induced by the working action of the die set, will be translated into rotary motion as balls 27A travel in grooves 41, 41A, 41B, etc. Thus, as inner race 20A extends beyond bushing 15A it will do so with a rotary lateral motion.

FIGURE 10 is a fragmentary enlarged cross sectional view which shows the point of contact 57, at the point of tangency of curved inner surface 16A with ball 27A and the line of contact 58 at the area where crown surface 52 engages post 12. It will be noted that groove 41 surrounds approximately forty percent of the circumference of ball 27A to provide ball 27A with a load capacity eight times that of the load capacity carried by ball 27A at point 57.

FIGURES 11 and 18 illustrate still another modified form of construction over the embodiment shown in FIGURES 7, 8, 9 and 10. A sleeve 60, of substantially the same construction as that of inner race 20B is provided so that both sides of balls 27B will be encased by the sleeve over an area of forty percent of the circumference of the ball 27B. In this manner ball 27B carries a load of eight times a point contact at opposite sides of the ball. FIGURES 11 and 18 illustrate a construction wherein the ends of the grooves in inner race 20B and in sleeve 60 are rolled over, respectively, at 125, 125A, 126, 126A to prevent the ball bearings 27B from rolling out of the respective grooves. In this construction, as in the form shown in FIGURE 7, the rolled over ends of the grooves may be a construction substituted for annular recesses and snap rings, as shown in FIGURES 2, 3 and 4.

In other respects, the construction shown in FIGURES 11 and 18 is the same as that described for the embodiment shown in FIGURES 7, 8 and 9.

FIGURES 12, 13, 14 and 15 illustrate still another modified form of a preloaded, axially extensible, antifriction bearing wherein a barrel roller 27C is employed in place of a ball roller 27.

Different types of roller elements will carry different loads. Barrel rollers 27C will carry a greater load than ball rollers 27. Therefore fewer barrel rollers 27C are needed to carry a given load when compared to ball rollers. The fewer the number of barrel rollers needed, the shorter the retainer 25 dimension A (FIGURE 3). Thus the stroke ratio of 2:1 may be increased for a four inch long bushing 13 and a retainer 25 of less than two inches in length. Restated: decreasing the length of the retainer 25 increases the length of travel of a preselected length bushing.

Attention is now directed to FIGURES 12, 13, 14, 15, 16 and 17 wherein is illustrated the construction of a barrel roller, 27C which is capable of carrying a greater load than ball roller 27. Applicant has adapted the barrel roller 27C into his construction as a substitute for ball roller 27 disclosed in FIGURES 1, 2, 3, 4 and 5.

Bushing 13C, retainer 25C and inner race 20C correspond, respectively, to bushing 13, retainer 25 and inner race 20 previously described. Bushing 13C is provided with an outside surface 15C and an outer race 16C.

Retainer 25C is provided with a circular body 75 longitudinally slit at 76 to provide resiliency so that body 75 may be distorted into assembled position. Circular body 75 is provided with a plurality of windows 77. Each window 77 is provided with an upper overhang and a lower overhang or upper finger 78 and lower finger 79, respectively. See FIGURES 16 and 17. Barrel rollers 27C are positioned in the plurality of windows 77 with upper fingers 78 and lower fingers 79 preventing the respective barrel roller 27C from falling out of the window, in one direction. Surfaces 78A and 79A of the respective window will prevent falling out in an opposite direction, thereby rotatively mounting barrel rollers 27C within retainer 25C.

A comparison between FIGURES 3 and 14 will show that three longitudinal rows of barrel rollers 27C will carry the same load as five longitudinal rows of ball rollers 27 with the consequent result that circular body 75 is shorter in length, dimension AA than dimension A, FIGURE 3. The telescoping ratio is thereby increased. Opposite ends of circular body 75 are "rolled over" as at 80, 81 to prevent knife like edges from projecting therefrom.

Inner race 20C is provided with a plurality of grooves 82, 83, 84, 85 and 86 separated by shoulders 87, 88, 89, 90, 91. Inner race 20C is provided with a longitudinal slit 92 and a smooth axial bore or inner surface 93.

Post 12, fragmentarily illustrated in FIGURE 14 is resiliently and slidably engaged by the axial bore or inner surface 93 as shown in FIGURES 12, 13 and 15.

Shoulders 87, 88, 89, 90 and 91 are provided on opposite ends with an upper annular recess 95 and a lower annular recess 96. Snap rings 97 and 98 are positioned, respectively, in upper and lower annular recesses 95 and 96.

FIGURE 15 illustrates that barrel rollers 27C engaging the grooves in inner race 20C with an area or "line" of contact. Grooves 82, 83, 84, 85 and 86 are shaped to accommodate the shape of barrel rollers 27C. It will be noted that grooves 82, 83, 84, 85 and 86 have an overall width dimension L which is less than the width of barrel rollers 27C dimension M. Since barrel rollers 27C project beyond the opposite ends of grooves 82 thru 86 they may slide sidewise in said grooves for self centering alignment and for the accommodation of side thrust transferred by the post through inner race 20C.

It will be noted that barrel roller bearing 27C makes a "line of contact" with inner race 16C; the full area of said barrel roller engaging the surface of inner race 16C, and barrel roller 27C makes a "line of contact" with the grooves 82 thru 86, dimension L so that the barrel roller bearing 27C is able to carry a vastly greater load than a "point" of contact of a ball bearing 27 illustrated in FIGURE 6 which is the conventional type of anti-friction bearing contact.

The assembling and operation of the pre-loaded, laterally extensible anti-friction barrel roller bearing 27C is the same as that described for the ball roller bearing 27.

Reference is now made to FIGURES 20, 21, 22, and 23 wherein is illustrated a dual radii roller type of anti-friction bearing which is the subject of my co-pending patent application Ser. No. 409,369 dated Nov. 6, 1964, now abandoned, for a Roller Bearing.

The distinguishing characteristics of this roller bearing 27D are that it has a contour of concentricity, radius O with the outer race 16D on two surfaces 90, 91 and with concentricity, radius P, on one surface or medial area 93 on inner race 20D thereby to provide a three linear area contact roller bearing, termed a "dual radii roller."

The dual radii roller 27D is held in retainer or cage 25D in the same manner as described for retainer 25C. Retainers 25C and 25D are identically constructed.

It will be noted, that in accordance with the concept, structure, function and result of the present invention, surfaces 90, 91 and 93 make "areas" of contact with the outer race 16D and inner race 20D, respectively, in place of a "point" of contact illustrated in FIGURE 6. In this manner dual radii roller 27D is able to carry a greater load than a "point" of contact bearing.

FIGURES 19 and 24 illustrate still another modified form of construction generally similar to FIGURES 11 and 18. In place of sleeve 60 (FIGURES 11 and 18) the wall of the outer race 16E is grooved at 100, 101, 102, etc., to accommodate forty percent of the diameter of balls 27E. Annular recesses 107, 108 are provided in the wall of outer race 16E to accommodate, respectively, snap rings, 109 and 110.

Inner race 20E has the opposite ends rolled over at grooves 111, 115, etc., to retain balls 27E within the respective grooves.

In other respects the construction shown in FIGURES 19 and 24 is the same as illustrated in FIGURES 11 and 18.

Having shown and described preferred embodiments of the present invention, by way of example, it should be realized that structural changes could be made and

What I claim is:

1. A laterally extensible anti-friction bearing consisting of a bushing having an inside surface forming a race wall, a retainer, roller elements, means rotatively holding said roller elements in a plurality of rows with a plurality of roller elements in each row in said retainer, said roller elements engaging said race wall to slidably mount said retainer within said bushing, means restricting the sliding movement of said retainer within said bushing, an inner race having a plurality of grooves, a plurality of interconnecting shoulders and a plurality of crowns formed in the back of said grooves, said roller elements rotatively engaging said plurality of grooves to slidably mount said retainer upon said inner race, means restricting the sliding movement of said retainer upon said inner race, and a post having an outer wall slidably mounted upon said plurality of crowns.

2. A laterally extensible anti-friction bearing consisting of a bushing having a pre-selected length and an inside surface forming a race wall, a retainer provided with a longitudinal split to provide means to compress said retainer, said retainer being shorter in length than the pre-selected length of said bushing, roller elements, means rotatively holding said roller elements in a plurality of rows in said retainer, said roller elements engaging said race wall to slidably mount said retainer within said bushing, an inner race of approximately the same pre-selected length as said bushing having a plurality of grooves, a longitudinal split to provide means to compress said inner race, a plurality of interconnecting shoulders, and a plurality of crowns formed in the back of said grooves, said roller elements rotatively engaging said plurality of grooves to slidably mount said retainer upon said inner race, and a post having an outer wall slidably mounted upon said plurality of crowns.

3. A laterally extensible anti-friction bearing consisting of a bushing having an inside surface forming a race wall, two circular recesses, one in each end of said race wall to define the length of a path of travel, a retainer having a longitudinal split to provide a resilient retainer, said retainer being shorter in length than said length of a path of travel, roller elements, means rotatively holding said roller elements in a plurality of rows in said retainer, said roller elements engaging said race wall to slidably mount said retainer within said bushing, an inner race, of approximately the same length as the length of said path of travel, having a plurality of grooves, a plurality of interconnecting shoulders, a plurality of crowns formed in the back of said grooves, and a longitudinal split to provide a resilient inner race, said roller elements being larger in diameter than the space between said plurality of grooves and said race wall whereby said roller elements become pre-loaded, two annular recesses, one in each end of said inner race, two snap rings one in each annular recess, two retaining rings one in each circular recess, said retaining rings defining the length of travel of said bushing in relation to said retainer, said snap rings defining the length of travel of said inner race in relation to said retainer, and a post having an outer wall frictionally and slidably mounted upon said plurality of crowns, said bushing slidably mounted upon said post through said roller elements with a path of travel greater than the length of the path of travel of said race wall.

4. A laterally extensible anti-friction bearing consisting of a bushing having an inner race wall, two circular recesses, one in each end of said inner race wall defining the length of a path of travel, a resilient retainer shorter in length than the length of said path of travel, ball members, means rotatively holding said ball members in said resilient retainer, said ball members engaging said race wall with a point of contact on each ball against said inner race wall to slidably mount said retainer within said bushing, a resilient inner race, of approximately the same length as the length of said path of travel, having a plurality of grooves, a plurality of interconnecting shoulders, a plurality of crowns formed in the back of said grooves, said ball members engaging said grooves with approximately one quarter of the diameter of each ball member to provide an area of contact between each ball member and a mating groove, said ball members being larger in diameter than the space between said plurality of grooves and said race wall whereby said ball members become pre-loaded, two annular recesses, one in each end of said inner race, two snap rings, one in each annular recess, two retaining rings, one in each circular recess, said retaining rings defining the length of travel of said bushing in relation to said resilient retainer, said snap rings defining the length of travel of said inner race in relation to said resilient retainer, and a post having an outer wall frictionally and slidably mounted upon said plurality of crowns, said bushing slidably mounted upon said post through said ball members with a path of travel greater than the length of the path of travel of said race wall.

5. A laterally extensible anti-friction bearing between a bushing and a post consisting of a bushing having an inner race wall and abutment means defining the length of a path of travel, a resilient retainer shorter in length than the length of said path of travel, a resilient inner race, of approximately the same length as the length of said path of travel provided with a plurality of helical grooves, a plurality of interconnecting shoulders between said plurality of helical grooves, and a plurality of crowns formed in the back of said plurality of helical grooves, a post having an outer wall frictionally slidable upon said plurality of crowns, anti-friction means provided in said resilient retainer and disposed in the space between said inner race wall and said helical grooves under loaded conditions whereby relative movement between said post and bushing rotates said resilient retainer in a helical path about said post with said bushing having a distance of travel greater than said length of a path of travel.

6. A laterally extensible anti-friction bearing between a bushing and a post consisting of a bushing having an inner race wall and abutment means defining the length of a path of travel, a resilient retainer shorter in length than the length of said path of travel, a resilient inner race, of approximately the same length as the length of said path of travel provided with a plurality of helical grooves, a plurality of interconnecting shoulders between said plurality of helical grooves, and a plurality of crowns formed in the back of said plurality of helical grooves, a post having an outer wall frictionally slidable upon said plurality of crowns, rolling elements provided in said resilient retainer and disposed in the space between said inner race wall and said helical grooves under loaded conditions whereby relative movement between said post and bushing rotates said resilient retainer in a helical path about said post with said bushing having a distance of travel greater than said length of a path of travel, abutment means on said inner race defining the length of travel of said inner race in relation to said resilient retainer, said rolling elements engaging said race wall with a point of contact on each rolling element, said rolling elements engaging said helical grooves with approximately one quarter of the surface of each rolling element to provide an area of contact between each rolling element and a mating helical groove.

7. A laterally extensible anti-friction bearing consisting of a bushing having an inside surface, a resiliently compressible retainer having an inside wall and an outside wall and provided with a plurality of rows of orifices, with a plurality of orifices in each row, roller elements rotatively mounted in said plurality of orifices and extending beyond both said inside wall and said outside wall, said roller elements extending beyond said outside wall rotatively engaging said inside surface to slidably mount said retainer within said bushing, means restricting the sliding movement of said retainer within said bushing, a resiliently compressible inner race having a plurality of grooves, a plurality of interconnecting shoulders, and a plurality of crowns formed in the back of said grooves, said roller elements extending beyond said inside wall rotatively engaging said plurality of grooves to slidably mount said retainer upon said inner race, means restricting the sliding movement of said retainer upon said inner race, and a post having an outer wall slidably mounted upon said plurality of crowns.

8. A laterally extensible anti-friction bearing consisting of a bushing having a wall with an inside surface, a plurality of longitudinal grooves provided in said wall, a retainer having an inside wall and an outside wall and provided with a plurality of rows of windows with a plurality of windows in each row, a plurality of roller elements, one for each window, means rotatively mounting each roller element in the respective window in which the roller element is located, said roller elements extending beyond both said inside wall and said outside wall, said roller elements extending beyond said outside wall rotatively engaging said plurality of longitudinal grooves with an area of contact between each roller element and the longitudinal groove it rotatively engages, means restricting the sliding movement of said roller elements at the end of said plurality of grooves, an inner race having a plurality of grooves, a plurality of interconnecting shoulders, and a plurality of crowns formed in the back of said plurality of grooves, said roller elements extending beyond said inside wall rotatively engaging said plurality of grooves to slidably mount said retainer upon said inner race, said roller elements engaging said plurality of last mentioned grooves with an area of contact between each roller element and the groove it rotatively engages, means restricting the sliding movement of said retainer upon said inner race, and a post having an outer wall slidably engaging said plurality of crowns, said retainer having a length proportionately less than the length of said inner race thereby to allow said bushing to move a distance on said post proportionately greater than the length of said inner race.

9. An axially extensible anti-friction bearing consisting of a bushing having an inside surface of circular curvature and preselected length, a resiliently compressible retainer of circulature curvature and of a length less than said preselected length having an inside and an outside wall and provided with a single row of a plurality of orifices, roller elements rotatively mounted in said plurality of orifices and extending beyond both said inside wall and said outside wall, said roller elements extending beyond said outside wall rotatively engaging said inside surface to slidably mount said retainer within said bushing, means restricting the sliding movement of said retainer within said bushing, a resiliently compressible inner race of circular curvature having a plurality of grooves, a plurality of interconnecting shoulders, and a plurality of crowns formed in the back of said grooves, said roller elements extending beyond said inside wall rotatively engaging said plurality of grooves to slidably mount said retainer upon said inner race, means restricting the sliding movement of said retainer upon said inner race, and a post having an outer wall slidably mounted upon said plurality of crowns.

10. An axially extensible anti-friction bearing consisting of a bushing having an inside surface of circular curvature and preselected length and provided with a plurality of longitudinal grooves, a retainer of circulature curvature and of a length less than said preselected length having an outside wall provided with one or more rows of orifices with a plurality of orifices in each row, ball elements rotatively mounted in said plurality of orifices, said ball elements extending beyond both said inside wall with more than forty percent of their surfaces and beyond said outside wall with more than forty percent of their surfaces, said ball elements extending beyond said outside wall rotatively engaging said plurality of longitudinal grooves with approximately forty percent of their surfaces to slidably mount said retainer within said bushing, means restricting the sliding movement of said retainer within said bushing, an inner race of circular curvature having a plurality of longitudinal grooves equal in number and parallel to the first mentioned longitudinal grooves, a plurality of interconnecting shoulders, and a plurality of crowns formed in the back of said second mentioned longitudinal grooves, said ball elements extending beyond said inside wall rotatively engaging said second mentioned longitudinal grooves with approximately forty percent of their surfaces to slidably mount said retainer upon said inner race, means restricting the sliding movement of said retainer upon said inner race, and a post having an outer wall, said plurality of crowns resiliently and slidably mounted upon said last mentioned outer wall.

References Cited

UNITED STATES PATENTS

| | | | |
|---|---|---|---|
| 531,723 | 1/1895 | Hill | 308—6 |
| 644,608 | 3/1900 | Keller | 308—201 |
| 845,632 | 2/1907 | Gurney | 308—201 |
| 1,542,300 | 6/1925 | Huther | 308—214 |
| 1,787,214 | 12/1930 | Shafer | 308—207 |
| 1,982,899 | 12/1934 | Buckwalter | 308—214 |
| 2,025,721 | 12/1935 | Broulhiet | 308—6 |
| 2,304,291 | 12/1942 | Wahlberg | 308—6 |
| 2,359,120 | 9/1944 | Kilajin | 308—217 |
| 2,696,411 | 12/1954 | Kircher | 308—217 |
| 2,782,080 | 2/1957 | Norton | 308—217 |
| 3,003,830 | 10/1961 | Blazek | 308—6 |
| 3,136,142 | 6/1964 | Zeidler | 308—6 X |
| 3,237,907 | 3/1966 | Dall | 308—6 X |
| 3,264,041 | 8/1966 | Lill | 308—6 |

FOREIGN PATENTS

| | | |
|---|---|---|
| 1,031,490 | 6/1953 | France. |
| 1,059,642 | 3/1954 | France. |
| 710,389 | 6/1952 | Great Britain. |
| 434,403 | 4/1948 | Italy. |

MARTIN P. SCHWADRON, *Primary Examiner.*

EDGAR W. GEOGHEGAN, *Examiner.*

L. L. JOHNSON, *Assistant Examiner.*